US008696857B2

(12) United States Patent
Mees (10) Patent No.: US 8,696,857 B2
(45) Date of Patent: Apr. 15, 2014

(54) METHOD FOR FORMING A FILTER MAT (75) Inventor: Harald Mees, Lebach (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 0 days.

(21) Appl. No.: 13/261,249

(22) PCT Filed: Nov. 19, 2010

(86) PCT No.: PCT/EP2010/007040
§ 371 (c)(1),
(2), (4) Date: Apr. 2, 2012

(87) PCT Pub. No.: WO2011/060949
PCT Pub. Date: May 26, 2011

(65) Prior Publication Data
US 2012/0205044 A1 Aug. 16, 2012

(30) Foreign Application Priority Data
Nov. 20, 2009 (DE) .......................... 10 2009 054 077

(51) Int. Cl.
*B32B 37/00* (2006.01)
(52) U.S. Cl.
USPC ..................................... 156/272.8
(58) Field of Classification Search
USPC ................ 156/293, 294, 272.2, 272.8, 250
See application file for complete search history.

(56) References Cited

U.S. PATENT DOCUMENTS

| 4,588,464 | A  | * | 5/1986 | Miyagi et al. ................ 156/218 |
| 5,418,035 | A  |   | 5/1995 | Iguchi et al. |
| 5,632,831 | A  |   | 5/1997 | Stull |
| 6,451,205 | B1 | * | 9/2002 | McGaw, Jr. ................ 156/73.3 |
| 7,112,255 | B2 | * | 9/2006 | Choi et al. ................. 156/293 |
| 2004/0173303 | A1 | * | 9/2004 | Altmeyer et al. ........... 156/73.1 |
| 2007/0051461 | A1 | * | 3/2007 | Pfleging et al. ........... 156/272.8 |

FOREIGN PATENT DOCUMENTS

| CA | 2553464 | | 7/2006 |
| DE | 4202769 | | 8/1993 |
| EP | 0139822 | | 5/1985 |
| EP | 0522692 | | 5/1992 |
| EP | 0498364 | | 8/1992 |
| EP | 498364 | A2 * | 8/1992 |
| EP | 1249182 | | 10/2002 |
| EP | 1249182 | A2 * | 10/2002 |
| JP | 8230833 | | 9/1996 |
| WO | 03009922 | | 2/2003 |

OTHER PUBLICATIONS

Machine translation of EP 1249182 A2, Oct. 2002.*

* cited by examiner

*Primary Examiner* — Daniel McNally
(74) *Attorney, Agent, or Firm* — Roylance, Abrams, Berdo & Goodman LLP (57) ABSTRACT

A method for forming a filter mat (1) suitable for filter fluids includes forming at least one web section (39) of a mat web (9) and at least one welding line (13, 15, 41) that seals the layers of at least one web section (39) of the mat web (9) to each other. Subsequently, at least one cut (19, 37) is carried out along the at least one welding line (13, 15, 41) such that the at least one web section (39) is cut forming at least one sealed edge region (43).

20 Claims, 6 Drawing Sheets

Fig.5
State of the Art

Fig.8
State of the Art

METHOD FOR FORMING A FILTER MAT

FIELD OF THE INVENTION

The invention relates to a method for forming a filter mat suitable for filtering fluids and comprises forming at least one web section of a mat web, with at least one welding line sealing together the layers of the web section of the mat web.

BACKGROUND OF THE INVENTION

Such filter mats and filter elements equipped with filter mats are used for filtering liquids, for example, in the form of hydraulic oil or solutions of any sort, for example, in the form of true suspensions, dispersions, emulsions, or colloidal solutions. The filter elements and filter mats have proved to be universally useful on account of their compact structure and their large filter surface area. The known filter elements, which are readily available through commercial channels, have a zigzag folded or pleated filter mat composed of multiple layers of different filter materials. The filter mat is laid around a solid support tube mounted in the interior of the filter element and is provided with passages. The multi-layered structure of that filter mat may have the following laminate structure, for example, from the one side to the other side:
1. metal wire mesh or plastic woven fabric or plastic screen with reticular structure,
2. polyester nonwoven fabric,
3. glass fiber mat or melt blown nonwoven fabric,
4. glass fiber mat or melt blown nonwoven fabric, paper nonwoven fabric, or polyester nonwoven fabric,
5. steel and polyester mixed woven fabric, and
6. metal wire mesh or plastic woven fabric or plastic screen with reticular structure.

In the course of an efficient production sequence, such a multi-layered mat web is passed through a cutting unit in the longitudinal direction of the web. In this cutting unit, the mat web is cut to size at its edges before it is passed to a folding machine, where the zigzag form or the pleat is formed. Then in the next phase of the production sequence, the cut web is severed into web sections, from which then the filter mat is made in the form of a tubular body.

In order to ensure that systems that use such filter elements and that often exhibit a high quality operate reliably, it is of crucial importance that the tubular filter mat that is manufactured as the end product of the aforementioned process steps be an absolutely clean component. To put it more succinctly, it must be ensured that the end product is totally free of impurities, like dirt particles, fiber particles, and the like. With respect to the construction of the multi-layered mat web made of glass fiber fabrics, nonwoven fabrics, woven fabrics, or screen structures, these requirements cannot be satisfied during the production process without more effort. Hence, the handling and temporary storage of the mat webs between the working steps result in fiber migration and fiber release, in particular also during the production steps of longitudinal cutting, folding, and cross cutting of the mat web at its edges. This situation poses a problem not only for the cleanliness of the component, but also renders the handling of the mat web and, hence, the automation of the production process more difficult. Automation is also rendered more difficult due to the tendency of the support layers in the mat web to end out.

DE 42 02 769 A1 discloses a filter, in particular a filter that is intended for use in gas filters, made of a zigzag folded and meltable web material with folds that are closed at the ends. The gas filter can be inserted into a housing such that the rims are sealed for separation of a downstream cleanroom. The object is to make it possible to seal the rim at the folded end edges as well as to form a closed frame element as simply and inexpensively as possible. To achieve this goal, the known solution provides that the end edges of the folds are melted and compressed so as to form an enlarged contact surface, thus forming a common, closed frame element as a composite of the individual contact surfaces. Then, sealing strips can be adhesively cemented or welded on this common composite of end edge surface areas in a simple way. The solution according to DE 42 02 769 A1 provides that the web material be welded on its long side. EP 0 522 692 A2 discloses a method of the aforementioned type for constructing a filter mat with a multi-layered web, which is welded on its end sides. With respect to the requirements for fabricating a filter end product of high component cleanliness, the known solutions leave much to be desired.

SUMMARY OF THE INVENTION

An object of the present invention is to provide an improved method that is easy to implement and ensures the fabrication of an end product that exhibits high component cleanliness.

The present invention basically achieves this object by a method where at least one cut is carried out along at least one welding line such that the at least one web section is cut to form at least one sealed edge region. The portion of the welding line remaining at the side edge or side edges of the mat web after the cut forms an edge seal, which seals the ends of all of the layers by the welding process that melts the synthetic plastic material of the layers. This feature suppresses fraying or a fiber migration at the edges. As a result, not only the mandatory component cleanliness is achieved, because the end product is free of glass fiber particles, but also manufacturing problems, like separation of the layers during handling and further processing, are avoided with a high degree of certainty.

In a preferred variant of the method according to the invention, at least one cut extends inside the respective welding line at a distance from its two side edges. At the same time, sealed edge regions are formed on both side edges when the mat web or more specifically at least one web section is cut.

Furthermore, it is advantageous that at least one welding line extends parallel to the longitudinal direction of the mat web. In addition, at least one welding line can be formed along a side edge of at least one web section. If one assumes a mat web of a corresponding width, then it is possible to carry out, in addition to the cuts along the longitudinal edges, at least one additional longitudinal cut dividing the mat web into partial webs in an especially advantageous way inside the mat web. Before the additional longitudinal cut is carried out along the same, an additional welding line is formed that seals together the layers of the mat web. The additional longitudinal cut inside this welding line is carried out at a distance from its two side edges. In this way, a plurality of partial webs with sealed longitudinal edges are formed simultaneously from one mat web so that an especially efficient production at a high production rate can be achieved.

In another preferred variant of the method according to the invention, the mat web is severed transversely to the longitudinal direction into at least two web sections. In addition, it is advantageous that at least one welding line extends transversely to the longitudinal direction of the mat web. Especially preferred is at least one welding line along a transverse edge of at least one web section. Furthermore, an advantageous arrangement of the invention provides that prior to severing the mat web or the partial webs into web sections along the cutting regions, an additional welding line is formed that seals together the layers of the respective mat web or partial webs and that extends transversely to the longitudinal edges. The severing is preferably carried out by a severing cut that extends inside this additional welding line at a distance from its two side edges.

This feature ensures the longitudinal edges against fiber migration or fraying and that all of the external edges of the web sections have edge seals. Comprehensive protection against any fiber migration is then provided. In a preferred variant of the method according to the invention, at least one web section is designed in the form of a rectangle, and/or all of the side edges, in particular the longitudinal edges and the transverse edges, have a sealed edge region.

The at least one web section is formed into a filter mat in an advantageous way. In so doing, the ends of the at least one web section can be bonded together, and the ends extend in or transversely to the longitudinal direction of the mat web. Typically, the filter mat is designed in the form of a tube.

Many applications have to use filter elements with filter mats that are constructed from a relatively high total number of individual layers, where frequently six layers are present. In particular, sensitive filter media cause welding problems if a larger number of layers, for example, twelve layers, have to be bonded together in a sealing manner in one working step to form a closed filter mat by bonding together the end edges of the web section. The invention facilitates the elimination of such problems due to the sealed edges on the web sections. To form a filter mat with a specified total number of layers, the web sections, which have a smaller number of layers, are laid one on top of the other with overlapping, sealed edge regions and are bonded together at the sealed edge regions. A filter mat with twelve layers of filter media can be constructed, for example, of two pre-finished—that is, sealed at the edges—web sections with six layers each, by carrying out a welding operation at the already sealed regions. This approach makes it possible to achieve a tight bond in a reliable way by a safe and efficient welding operation without having to be concerned about a thermal degradation of even sensitive filter media.

The bonding can be carried out in such an especially advantageous way that a welding operation is carried out at the external edge of the sealed edge regions and at a distance from the inner edge of the sealed edge regions, so that sensitive filter media are protected against thermal degradation in a particularly effective way.

In especially preferred exemplary embodiments, the bonds are formed by welding with the use of a welding filler. For example, a film is inserted between the sealed regions and is made of a synthetic plastic material. In this case, a welding filler, forming a hot melt adhesive, for example, a PBT film, can be used.

If the welding operation is carried out by laser welding, a welding filler that forms a barrier layer for laser light can be used.

To manufacture filter elements with a tubular filter mat that is bonded on at least one axial end to a peripheral rim of an end cap made of a synthetic plastic material, an especially advantageous arrangement of the invention provides that the bonding is carried out by welding the sealed edge region of the filter mat to the peripheral rim. In contrast to the conventional procedure, wherein the open, unsealed end edge of the filter mat is cemented into the respective end cap so that there is the risk of leakage and the absence of structural strength, the welding of the sealed edge region of the filter mat to the end cap produces an optimal and reliable bond that can be produced in a cost-efficient way.

According to the invention, the arrangement can be configured in such an especially advantageous way that when welding to the end cap, a welding filler at the sealed edge region of the filter mat is used in the manner of a hot melt adhesive as a bonding aid.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
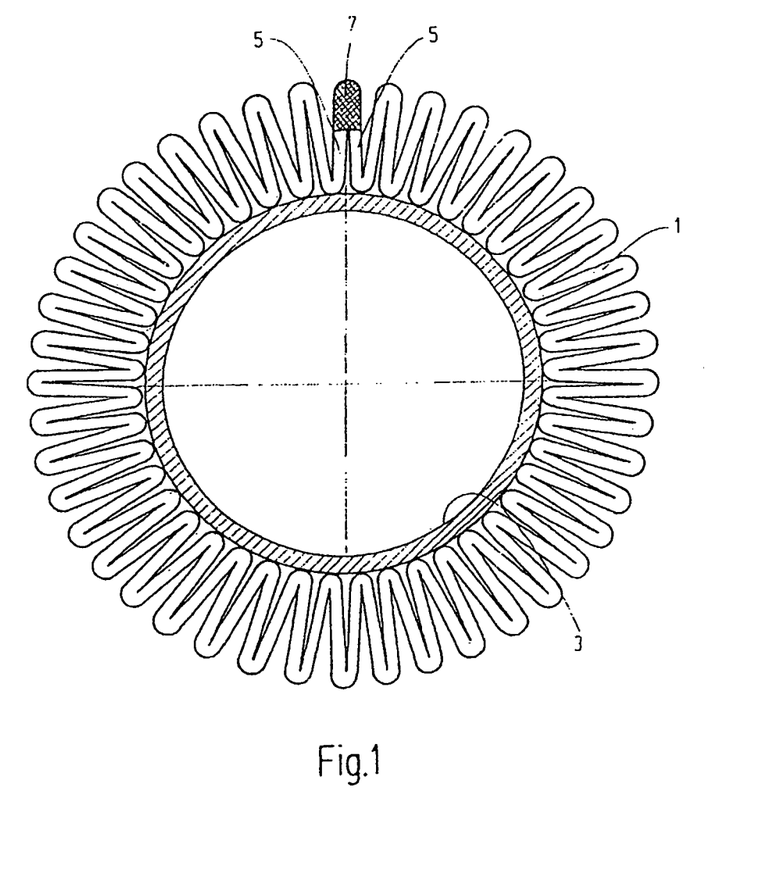
FIG. 1 is a partial end elevational view and partial sectional view of the inner portion of a filter element with a filter mat manufactured according to the an exemplary embodiment of the invention.
Figure 4:
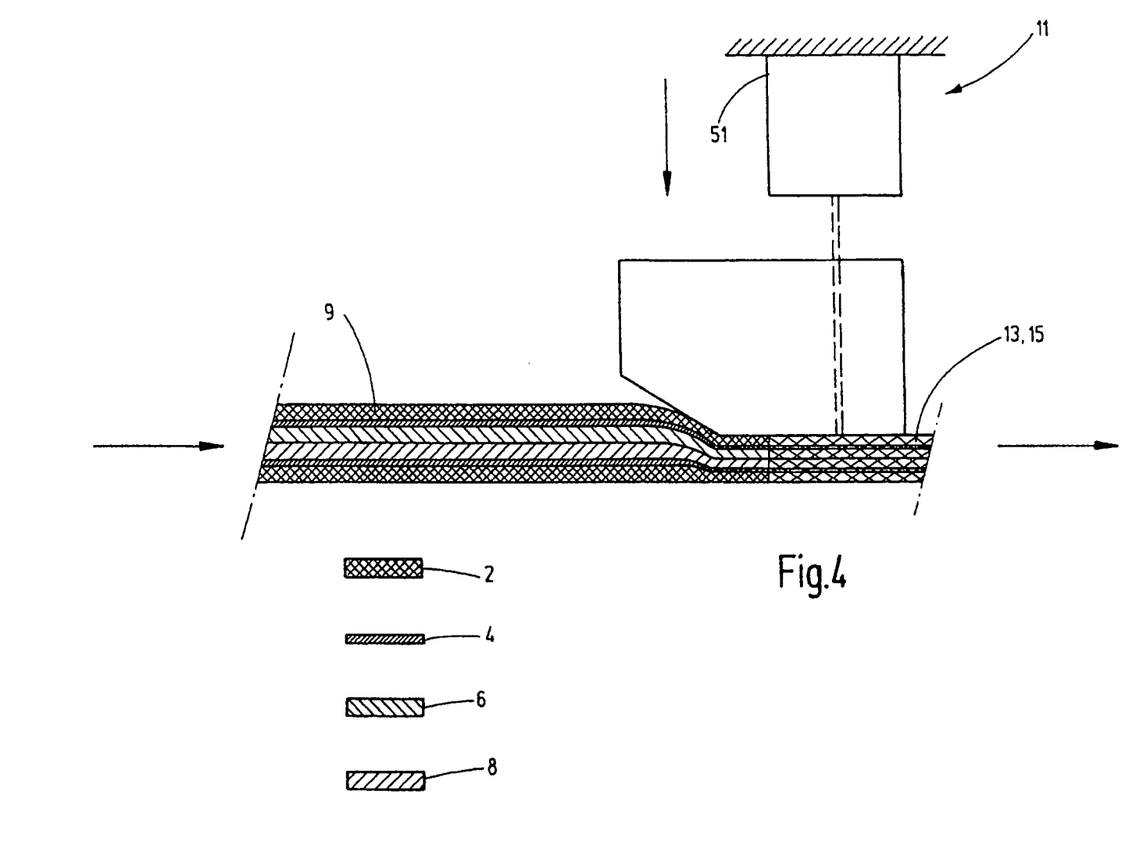

FIG. 1 shows the tubular filter mat 1 of the filter element being manufactured. This tubular filter mat is folded in a zigzag fashion or pleated. To support the filter mat 1, the interior of the filter element has a metal support tube 3 provided with fluid passages. The filter mat 1 is made of multiple layers, which are not depicted in detail in FIG. 1, but are clearly marked in some places in FIG. 4 with reference numerals. In addition, the filter may have the following laminate structure, for example, from the exterior to the interior:

1. metal wire mesh or plastic woven fabric or plastic screen with reticular structure 2 (FIG. 4),
2. polyester nonwoven fabric 4 (FIG. 4), 3. glass fiber mat or melt blown nonwoven fabric 6 (FIG. 4),
4. paper nonwoven fabric or polyester nonwoven fabric 8 (FIG. 4),
5. polyester nonwoven fabric 4 (FIG. 4), and
6. metal wire mesh or plastic woven fabric or plastic screen with reticular structure 2 (FIG. 4).

For a multi-layered structure, the interior of these six layers can contain additional support layers.

The two ends 5 of the filter mat 1 that face each other converge at an acute angle when the filter mat 1 is laid around the support tube 3 in the form of a tube, and are permanently bonded together by a weld 7 produced by a thermal welding operation. The weld 7 can be carried out by ultrasonic welding or laser welding without welding fillers, because the multi-layered laminate structure of the filter mat 1 contains materials exhibiting good thermal welding properties, such as, for example, polyamide or polyester materials. However, the method according to the invention also includes, as explained in detail below with reference to FIGS. 6 and 7 as well as 9 and 10, the formation of bonds made by welding with welding fillers.

Figure 2:
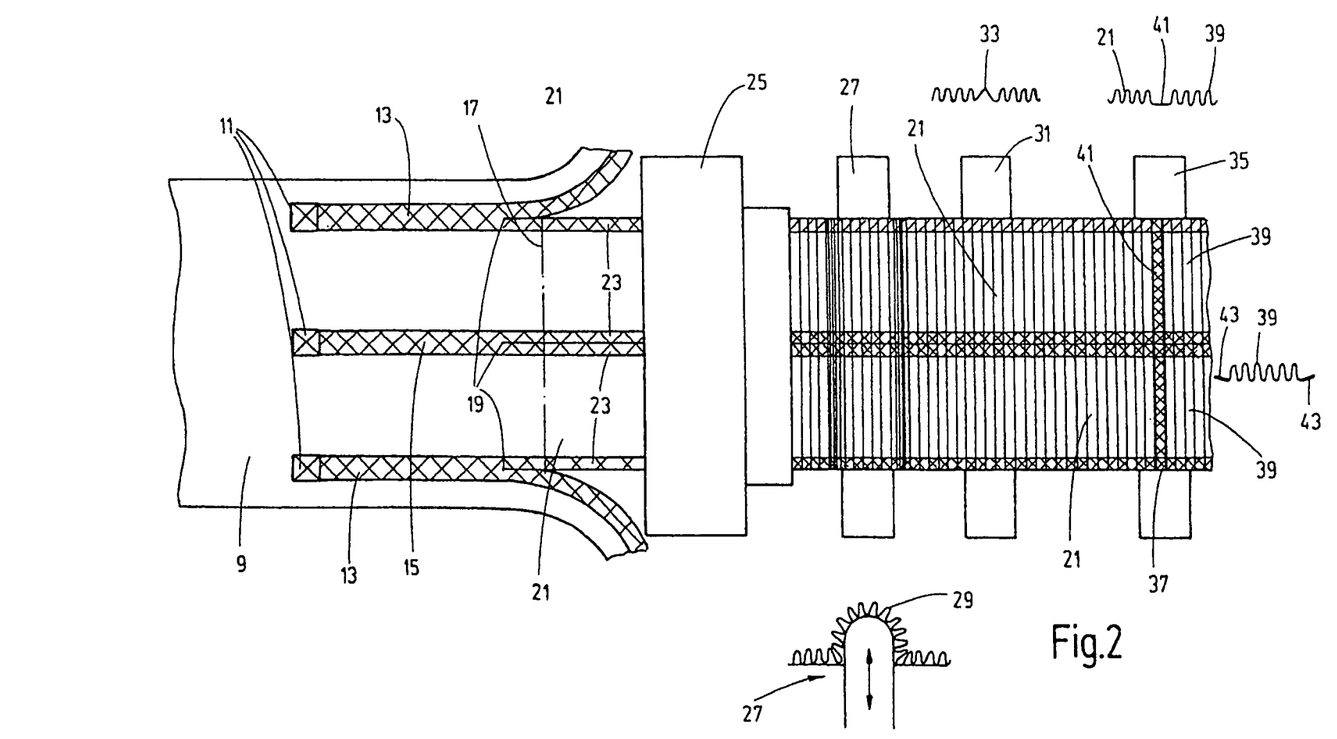
FIG. 2 is a highly simplified schematic drawing of the manufacturing sequence for producing pleated subsections for the fabrication of the filter mat according to the exemplary embodiment of the invention.

FIG. 2 elucidates the production process of web sections for the tubular filter mats 1. In this case, an unpleated mat web 9 is fed to the laser or ultrasonic welding units 11 in a working or feed direction extending from left to right in FIG. 2. Of these laser or ultrasonic welding units, the welding units 11, which are located on the outside or the edge side, form a welding line 13, extending along the longitudinal edges of the mat web 9. This welding line is formed such that the layers of the mat web 9—for example, six layers—are sealed together through the entire laminate structure. The welding unit 11, located in the middle of the mat web 9, produces a uniform welding line 15. Together with the resulting welding lines 13, 15, the mat web 9 is advanced to a longitudinal cutter 17, which cutter performs one cut 19 in each of the welding lines 13, 15. In the drawing from FIG. 1, this cut lies centrally inside the welding lines 13, 15, so that after the cut the mat web 9 is divided into partial webs 21, which have sealed longitudinal edges 23. These partial webs 21 then pass to a folding machine 25, which is shown in schematic form. The pleated partial webs 21, issuing from this folding machine, then pass to a temporary storage 27, which forms a variable web loop 29 as the compensating device for variable feed rates. From the storage 27, the partial webs 21 then pass to a counter and processor 31, which form, after an allotted number of pleated folds, a stretching station 33 in preparation of a subsequent welding and cutting operation carried out in an integrated welding and cutting device 35. Before this welding and cutting device executes a severing cut 37 that extends perpendicularly to the feed direction and that severs the partial webs 21 into the allotted web sections 39, a transverse welding line 41 is formed, and in particular in the same way as the welding lines 13 and 15, so that a severing cut 37 in turn is formed centrally inside the welding line 41.

Thus, the web sections 39, which have weld legs 43 that are sealed not only at the longitudinal edges 23, but also at the transverse edges, exit the manufacturing device from FIG. 2. In other words, the web sections 39 have no free unsealed edges whatsoever, so that the layers of the formed filter mat are enclosed all around in such a manner that it is not possible for thread or fiber material to migrate out of the mat structure. At the same time, the weld legs 43, comprising the transversely extending welding line 41, serve to form the connecting weld 7 at the ends 5 of the formed tubular filter mat 1, which ends all laid against each other (FIG. 1).

Figure 3:
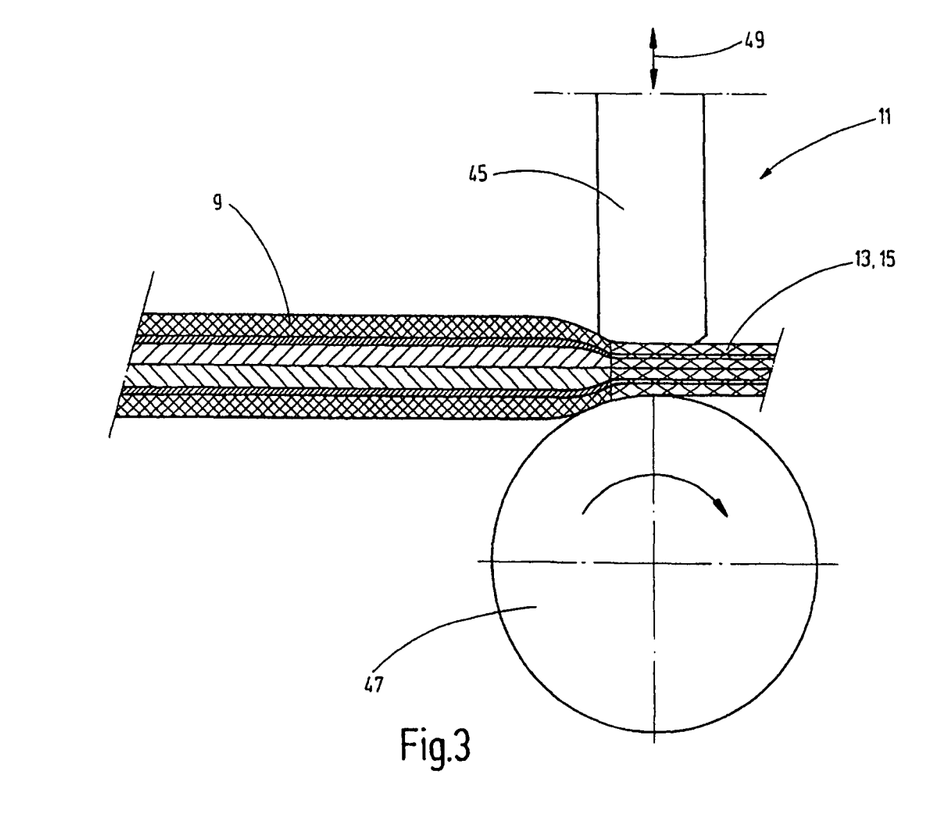
FIGS. 3 and 4 are schematic side elevational views, in section and not drawn to scale, elucidating the welding operation used for sealing the edges of a six-layered mat web carried out with an ultrasonic welding machine and a laser welding machine, respectively, according to exemplary embodiments of the invention.

FIGS. 3 and 4 are highly simplified drawings (not drawn to scale) of two possibilities for designing the welding units 11 for forming the welding lines 13 and 15 that extend in the working or longitudinal direction. FIG. 3 shows an ultrasonic welding unit with a ram-shaped sonotrode 45 and an anvil 47. In this case, the anvil 47 is formed by a roller that is rigidly mounted on the axle, whereas the sonotrode 45 is movable for the welding operation, as indicated by the double arrow 49. In the illustrated example, the sealing welding operation takes place at a mat web 9 made of six layers.

FIG. 4 elucidates, in a corresponding manner, the sealing welding operation by a welding unit 11 in the form of a laser welding machine. In this respect, a stationary laser 51 in conjunction with a barrier layer (not shown in detail) for laser light delivers the thermal energy for the welding operation in the conventional manner. To obtain a good bond, a laser 51 can also be mounted on both sides, that is, above or beneath the web.

Figure 5:
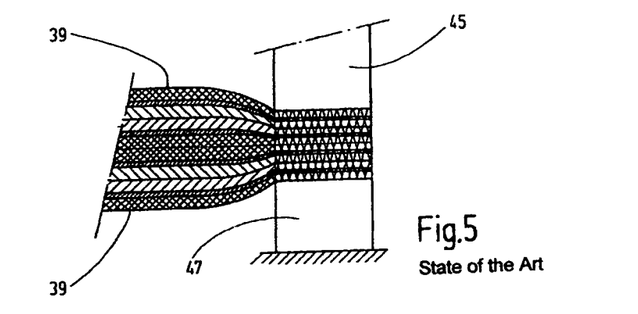
FIG. 5 is a schematic side elevational view, in section (not drawn to scale) of an ultrasonic welding machine for producing a conventional weld on a twelve layer filter mat known from the prior art.

As stated above, filter elements, which satisfy even stringent requirements, are provided with filter mats 1 that are constructed of a relatively large number of layers. If the welding operations, required to fabricate filter mats 1, are conducted with a large number of layers, then the method according to the prior art takes such steps that it is possible to carry out intensive welding operations in order to produce reliable bonds, a process that can result in a higher thermal load on sensitive layers of the mat webs, or that it is possible to carry out welding operations in a special and complex way, as disclosed, for example, in WO 01/05483 A1. In this case, the ends of a pleated filter mat that face each other are fastened by a connecting strip that extends at least partially over the ends. The connecting strip, which is formed of a thermally deformable synthetic plastic material, is welded to the ends of the filter mat. At the same time, the welding point is provided with an impression. The present FIG. 5 shows the formation of a weld on a twelve-layered mat web 53 according to the prior art by an intensive welding operation that is carried out by ultrasonic welding between the sonotrode 45 and the anvil 47. As stated above, this procedure often results in a high thermal load on sensitive layers of the web 53.

Figure 6:
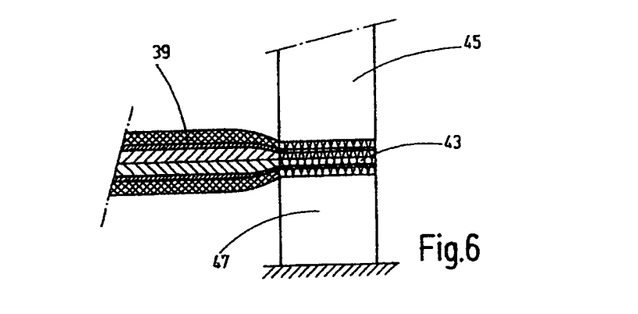
FIG. 6 is a schematic side elevational view in section of depicting the production of a sealing weld by an ultrasonic welding machine for carrying out the method according to an exemplary embodiment of the invention.
Figure 7:
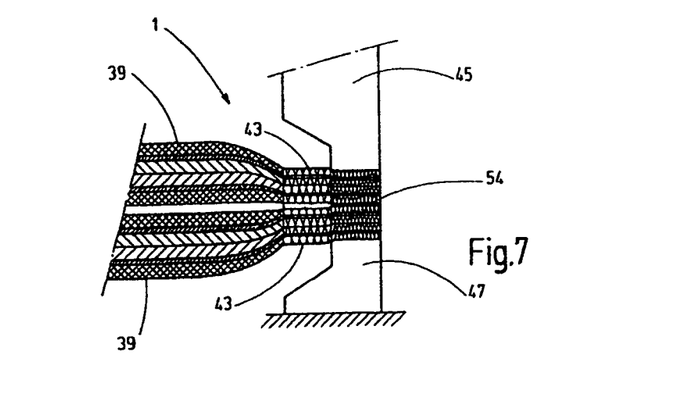
FIG. 7 is a schematic side elevational view in section of an ultrasonic welding machine for producing a sealing weld on a twelve-layered mat web, which is manufactured according to an exemplary embodiment of the inventive method of two six-layered mat webs that are manufactured according to FIG. 6.

In contrast, FIGS. 6 and 7 elucidate the inventive procedure. In this case, it is assumed that the web section 39 has six layers and that its edges are provided with a seal that forms the sealed weld legs 43. After two web sections 39, each of which is composed of six layers, are laid against each other, the welded bond for forming the finished twelve-layered filter mat 1 is now made not at the free end edges, but rather at the already sealed weld legs 43. FIG. 7 shows that the welding process that produces a reliable bond can take place along the external edge 54—that is, separated by the free region of the weld legs 43—at a safe distance from the inner layers of the web sections 39, so that the layers of the filter mat 1 remain unaffected even during an intensive welding operation carried out at the external edge 54.

Figure 8:
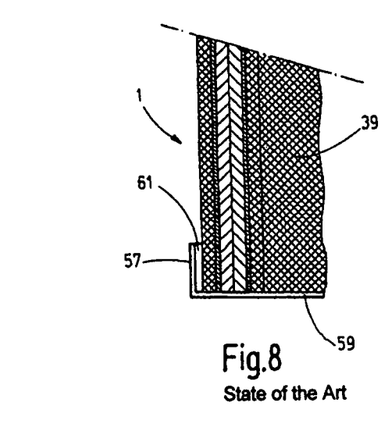
FIG. 8 is a schematic side elevational view in section (not drawn to scale) of the bonding region between the filter mat and the peripheral rim of a filter element end cap according to the prior art.

The filter mats 1 that are produced according to the inventive method also make possible an especially efficient and reliable bond between the axial ends of the respective filter mat 1 and a peripheral rim 57 of a plastic end cap 59 of the filter element. FIG. 8 shows that in the prior art the unsealed edge of the filter mat 1 is cemented to the end cap 59 and the peripheral edge 57 by a bed of adhesive 61. This procedure according to the prior art runs the risk of leakages. Furthermore, tolerances of the fold heights of the filter mats 1 prevent the end caps 59 from ensuring that the prestress of the filter mats 1 will always be constant.

Figure 9:
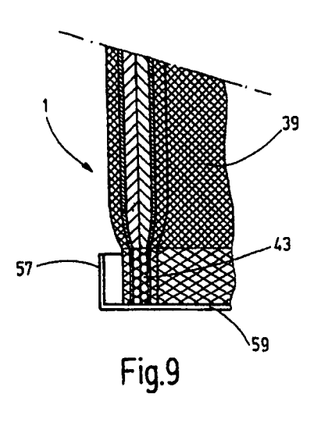
FIGS. 9 and 10 are side elevational views in section (not drawn to scale) of bonding regions between the filter mats and the peripheral rims of filter end caps manufactured according to exemplary embodiments of the invention.
Figure 10:
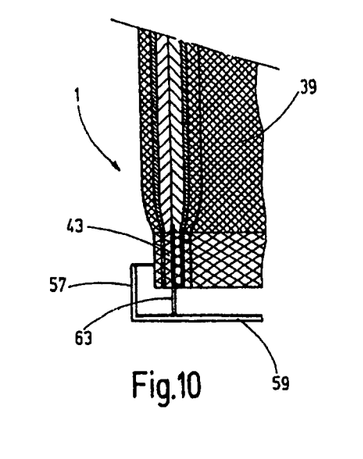

Owing to the presence of the sealed weld legs 43, the invention remedies the aforementioned problems. FIG. 9 shows that the sealed weld legs 43 can be welded directly to the peripheral rim 57, so that there is no need for a bed of adhesive. The peripheral rim 57, made of a synthetic plastic material, and the sealed weld legs 43 offer in themselves the materials required for the thermal welding process, so that the welding operation can be carried out without welding fillers. The result is a tight and rigid bond. In contrast, FIG. 10 elucidates an alternative, wherein the sealed weld leg 43 has a welding filler 63. In this case, it can be a film made of polybutylene terephthalate. Such a PBT film, sold under the brand name "Vestodur®," can form a kind of hot melt adhesive during the welding operation. In addition, such a filler can serve as the laser barrier layer that is opaque to laser light when the welding operation is carried out by laser welding.

While various embodiments have been chosen to illustrate the invention, it will be understood by those skilled in the art that various changes and modifications can be made therein without departing from the scope of the invention as defined in the appended claims.

What is claimed is:

1. A method of forming a filter mat suitable for filtering fluids, comprising the steps of:
welding a first web section of a filter mat web having multiple layers to form a first welding line sealing together the layers of the first web section of the filter mat web;
subsequent to the welding of the first web section, making a first cut along and through said first welding line such that the first web section is cut to form a first sealed edge region of the first web section; and
subsequent to the making of the first cut, forming pleats in the first web section.

2. A method according to claim 1 wherein the first web section is formed into a filter mat after forming of the pleats.

3. A method according to claim 2 wherein ends of the first web section are bonded together after forming the pleats, with the ends extending transversely to a longitudinal direction of the filter mat web.

4. A method according to claim 3 wherein the first web section is formed into a tube after forming the pleats.

5. A method according to claim 4 wherein at least one axial end of the first web section formed into the tube is bonded to a peripheral rim of an end cap of synthetic plastic material by welding the first sealed edge region of the first web section to the peripheral rim.

6. A method according to claim 5 wherein a welding filler at the first sealed edge region of the first web section is used as a hot melt adhesive as a bonding aid when welding the first sealed edge region to the peripheral rim of the end cap.

7. A method according to claim 1 wherein the filter mat with a specified total number of layers is formed with web sections of a relatively smaller number of the layers than the specified total number of layers laid on top of one another and overlapping; and
edge regions are bonded together forming sealed edge regions.

8. A method according to claim 7 wherein the edge regions are bonded by welding at external edges of the sealed edge regions and at distances from inner edges of the sealed regions.

9. A method according to claim 8 wherein the welding uses a synthetic plastic welding filler film inserted between the sealed edge regions.

10. A method according to claim 9 wherein the welding filler film forms a hot melt adhesive and is a PBT film.

11. A method according to claim 1 wherein the first welding line extends transversely to a longitudinal direction of the filter mat web.

12. A method according to claim 11 wherein the first welding line is formed along a transverse edge of the first web section.

13. A method according to claim 1 wherein the first cut extends inside the first welding line at a distance from opposite side edges of the first welding line.

14. A method according to claim 1 wherein the first welding line extends parallel to a longitudinal direction of the filter mat web.

15. A method according to claim 1 wherein the first welding line is formed along a longitudinal edge of the first web section.

16. A method according to claim 1 wherein the filter mat web is severed transversely to a longitudinal direction thereof into the first web section and a second web section.

17. A method according to claim 1 wherein the first web section is rectangular with longitudinal and transverse edges thereof having welding lines forming sealed edge regions along the edges.

18. A method according to claim 1 wherein the welding is performed by laser welding with a welding filler forming a barrier layer for laser light.

19. A method of forming a filter mat suitable for filtering fluids, comprising:
welding a rectangular filter mat web along first and second welding lines extending parallel to a longitudinal direction of the filter mat web and along third and fourth welding lines extending transversely to the longitudinal direction;
subsequent to the welding of the filter mat web, making first, second, third and fourth cuts along and through said first, second, third and fourth welding lines, respectively, such that the filter web is cut to form first, second, third and fourth sealed edge regions forming an entire periphery of the filter mat web; and
subsequent to the making of the first, second, third and fourth cuts, forming pleats in the filter mat web.

20. A method according to claim 19 wherein welding the filter mat web along a fifth welding line parallel to and between the first and second welding lines and cutting along and through the fifth welding line to form first and second rectangular filter web sections prior to the forming of the pleats.

* * * * *